United States Patent
Marquet et al.

(10) Patent No.: US 7,305,554 B2
(45) Date of Patent: Dec. 4, 2007

(54) DYNAMIC ACQUISITION OF STATE DURING SECURITY SYSTEM RECONFIGURATION

(75) Inventors: Bertrand Marquet, Ottawa (CA); Adrian Mario Rossi, Ottawa (CA); Francois J. N. Cosquer, Kanata (CA)

(73) Assignee: Alcatel Canada Inc., Kanata, ON (CA)

( * ) Notice: Subject to any disclaimer, the term of this patent is extended or adjusted under 35 U.S.C. 154(b) by 675 days.

(21) Appl. No.: 10/319,639

(22) Filed: Dec. 16, 2002

(65) Prior Publication Data

US 2004/0117622 A1    Jun. 17, 2004

(51) Int. Cl.
*H04L 9/00* (2006.01)
*G06F 15/16* (2006.01)
*G06F 15/173* (2006.01)

(52) U.S. Cl. .................... 713/165; 713/150; 713/193; 709/203; 709/224; 709/226

(58) Field of Classification Search ................ None
See application file for complete search history.

(56) References Cited

U.S. PATENT DOCUMENTS

| | | | |
|---|---|---|---|
| 6,230,194 B1 | 5/2001 | Frailong et al. | |
| 6,336,135 B1 * | 1/2002 | Niblett et al. ............... | 709/227 |
| 6,343,320 B1 | 1/2002 | Fairchild et al. | |
| 6,397,336 B2 * | 5/2002 | Leppek ......................... | 726/1 |
| 6,490,624 B1 * | 12/2002 | Sampson et al. ........... | 709/227 |
| 2002/0188706 A1 | 12/2002 | Richards et al. | |

FOREIGN PATENT DOCUMENTS

EP    1345437 A2    9/2003

OTHER PUBLICATIONS

"An approach to dynamic reconfiguration of distributed systems based on object-middleware", Joao Paulo A. Almeida et al., Proceedings of the 19th Brazilian Symposium on Computer Networks (SBRC 2001), May 2001.
"Trust-adapted enforcement of security policies in distributed component-structured applications", Peter Herrmann et al., IEEE, 2001.
"Security characterisation and integrity assurance for component-based software", Jun Han et al., IEEE 2000.

* cited by examiner

*Primary Examiner*—Gilberto Barrón, Jr.
*Assistant Examiner*—Laurel Lashley
(74) *Attorney, Agent, or Firm*—Marks & Clerk; S. Mark Budd

(57) ABSTRACT

Systems and methods of dynamically introducing security features into a client-server application program are described. A security server between an application server and a database has multiple security components with a shared dependency. This shared dependency enables the introduction of a new security component providing a new security function without compromising the security of the application program. The new security component acquires state information from other security components in the security server thereby dynamically reconfiguring the component-based security system.

12 Claims, 2 Drawing Sheets

Security State Acquisition Process

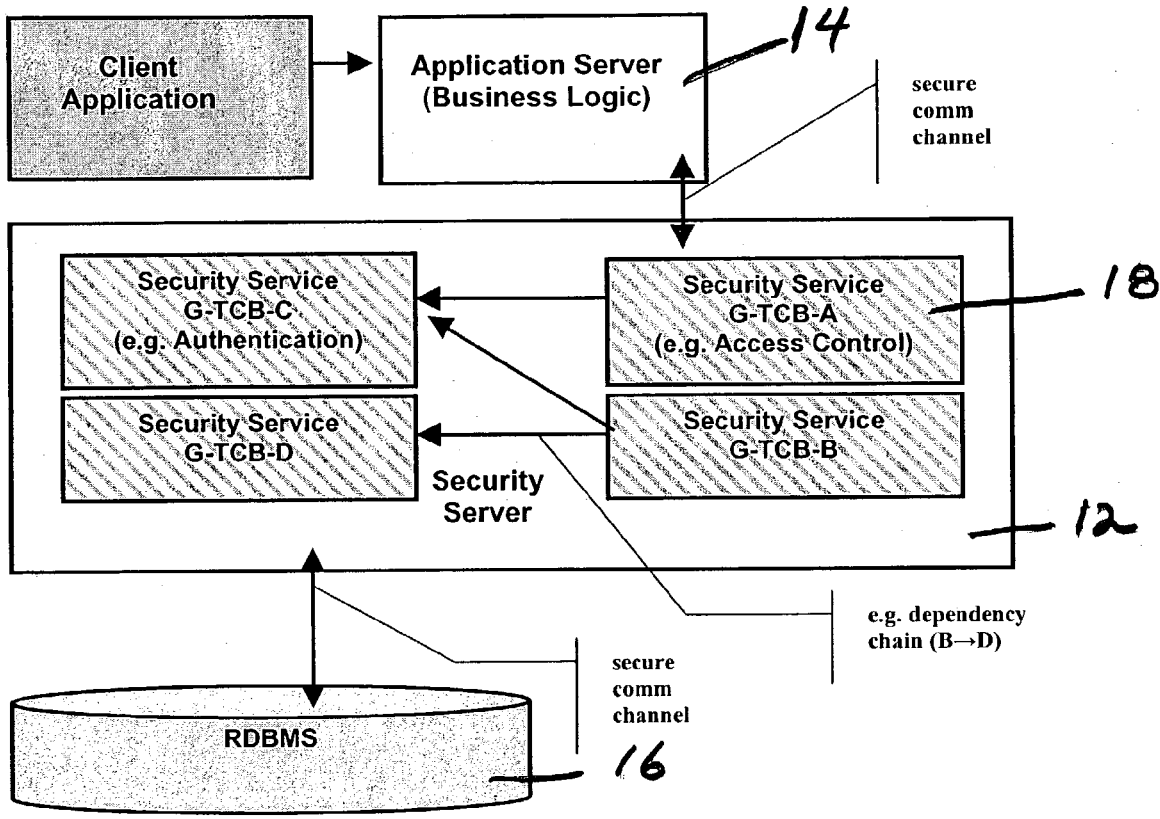
Fig. 1: Common Hardware Configuration
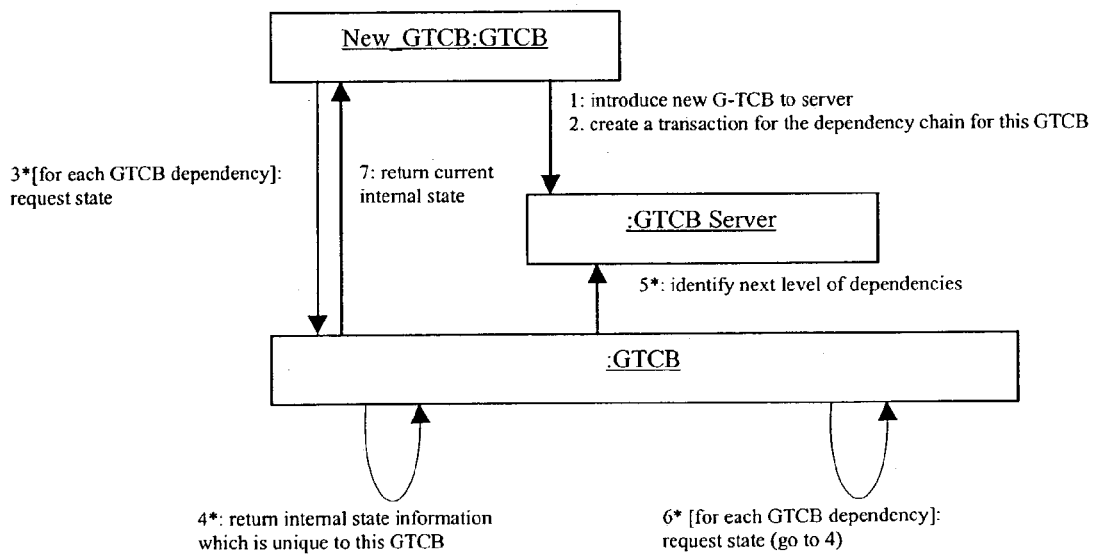
Fig. 2: Security State Acquisition Process

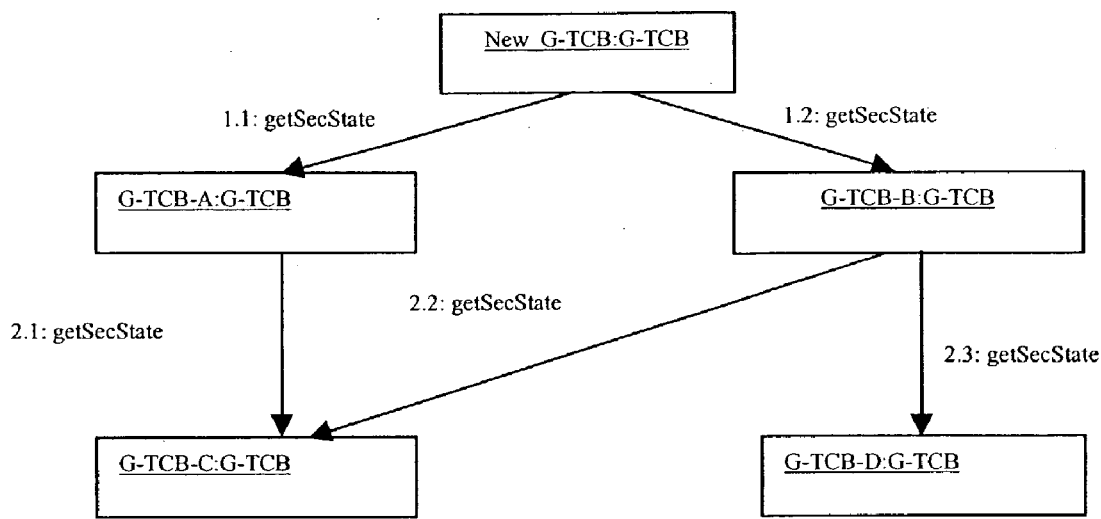
Fig. 3: Possible Security-State Acquisition Transaction showing dependencies
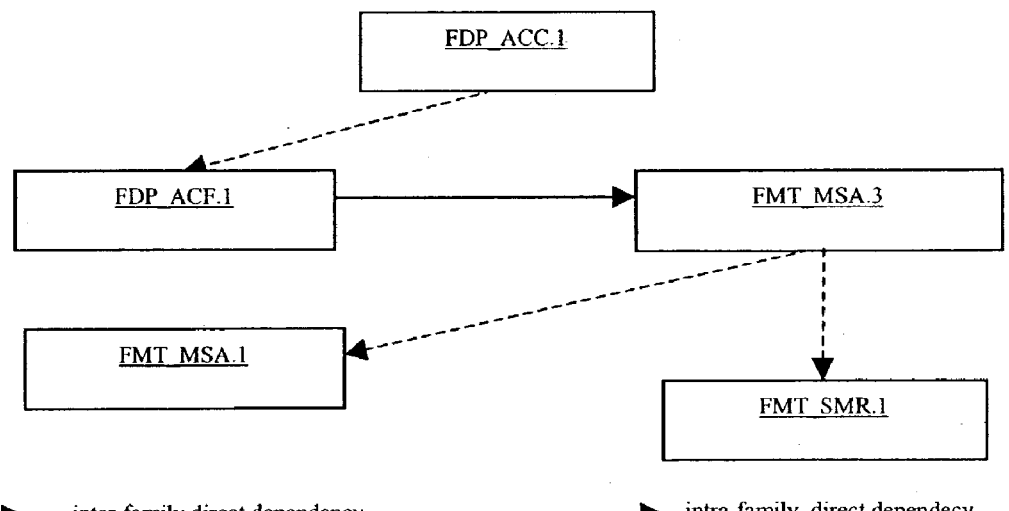
Fig. 4: Dependency Tree for CC Functional Component FDP_ACC.1

DYNAMIC ACQUISITION OF STATE DURING SECURITY SYSTEM RECONFIGURATION

FIELD OF THE INVENTION

This invention relates to client-server application programs and more particularly to the dynamic acquisition of security services in component-based security systems.

BACKGROUND

Communications systems incorporating client-server architectures are subject to security related issues including, but not limited to, confidentiality, integrity and availability. Components and systems to defend against malicious security attacks are being developed and implemented in networks and commercial products. These components and systems, whether in hardware, software or firmware, are typically implemented as full-service security packages including security features that may or may not be required by the application program. This frequently results in the allocation of considerable memory for storing security services while somewhat less security and hence less system storage may be sufficient for a particular application. For example, a mobile device has limited storage capacity and the installation of a complete security package may unnecessarily use resources that may be required for other functions.

To get around this misuse of system resources it is known to install minimum security services in a system on configuration and then add further security services when needed. Heretofore, the addition of such further security services has necessitated the static reconfiguration of the system with the resulting temporary loss of service.

The prior art includes a number of publications and conference presentations dealing with distributed systems and security functionality associated therewith. In a paper entitled An Approach To Dynamic Reconfiguration Of Distributed Systems Based On Object Middleware by Almeida et al. Proceedings of the $19^{th}$ Brazilian Symposium on Computer Networks, Santa Catarina, May 2001, dynamic reconfiguration is discussed. This reference is concerned with an increasing demand for long running and highly available systems. According to the paper this demand holds particularly for distributed systems based on object middleware which is becoming increasingly popular. Dynamic reconfiguration consists of modifying the configuration of the system during run time, contributing to the availability of the system. The paper introduces a novel approach to dynamic reconfiguration of the distributed systems based on object middleware. The paper also discusses some issues related to the implementation of this approach and proposes a design for a dynamic reconfiguration service using CORBA standard mechanisms. The approach of handling dynamic reconfiguration described in this paper is a general one focussed on insuring state consistency during reconfiguration. There is no mention of security or the security implications of reconfiguration in this reference.

A second reference is a paper entitled "Trust-adapted Enforcement of Security Policies in Distributed Component-Structured Applications" by Herrmann and Krumm, IEEE, 2001. In this paper software component technology is described as supporting cost effective development of specialized applications. This technology, however, introduces special security problems. According to the paper some major problems can be solved by the automated run time enforcement of security policies. Each component is controlled by a wrapper which monitors the components behavior and checks its compliance with the security behavior constraints of the components employment contract. Since control functions and wrappers can cause substantial overhead the paper discusses trust-adapted control functions where the intensity of monitoring and behavior checks depends on the level of trust, the component, its hosting environment and its vendor have currently in the eyes of the application administration. The paper reports on wrappers and a trust information service which outline the embedding security model and architecture and describes a Java-bean based experimental implementation. The paper considers security issues such as policy enforcement and trust management within a distributed component environment. It describes automated run time enforcement of security policies using a trust adapted algorithm for minimizing the overhead of satisfying a component's employment contract before rendering the service to the consumer. Distributed security issues are well described but the issue of dynamically synchronizing security state between software components is not addressed in this publication.

A third paper of interest is entitled "Security Characterization and Integrity Assurance for Component-Based Software by Khan, Han and Zheng in Software Methods and Tools 2000. In this paper a security characterization structure of software components and their composition is proposed. A structure provides a preliminary modeling of security properties of stand-alone software components and some of their compositional primitives. In this paper security properties related to user data protection of software components are discussed. The proposed compositional specification makes an attempt to model the resulting effect between security attributes of two contracting components. The compositional specification structure can capture the results of combined security specifications of two participating components in a contract. The security specification syntax is based on four compositional elements: identities of contracting components, actions to be performed in a compositional relationship, security attributes supported by components, and resources to be used by other components. The structure is used in an example of secure interactions over a network to illustrate the applicability of the proposed work. The paper does not address live reconfiguration issues instead focussing on static component-based systems and how security assurance is propagated up to the system from the individual components. The present invention focuses on dynamic reconfiguration which deals with issues of temporal synchronicity and conflict resolution in addition to the static issues addressed in the article.

Finally, a paper entitled "Composing Security-Ware Software" by Khan and Han, IEEE Software, Volume 19, Issue 1, January-February 2002, discusses component security concerns as being two-fold: how to build secure components and secure composite systems from components and how to discuss disclosed components security properties to others. The article addresses the latter, rather than propose any new security structure they present a security characterization framework. Their approach concerns the security functions of software components by exposing their required and ensured security properties. Through a compositional security contract between participating components, system integrators can reason about the security affects of one component on another. This paper describes a security characterization framework for exposing the security functions of software components through a compositional security contract (CSC). The contract is meant to allow system integrators to assess both how security services interact between components and how they sum to determine the overall system security characteristics. However, the article makes no attempt to propose any new security architecture which is an aspect of the present invention. The present invention proposes a distinct security integration environment for security components. This ensures that, within the confines of the secured environment, components are protected and are able to interact securely in order to provide predictable aggregated security service to external applications.

Therefore, although the prior art separately addresses dynamic reconfiguration and component based security systems it fails to address the problem of dynamically reconfiguring a component based security system. This is the problem to which the present invention provides a solution.

The present invention is directed to a Secure Security-Services server containing security components which together form an encapsulated security architecture. Each component possesses an independent security state which allows a transaction-oriented state acquisition to occur in accordance with the dependencies between the security components. The system relies on a separation of security functions from business services in carrying out the security services.

Accordingly, the present invention relates to the adding, in real-time, of a new security component (e.g. in order to provide a new security service), into a secure environment and the acquisition of the state of other active security components on which the new component is dependent (a dependency exists when the security state of the new component depends on acquiring security state information from another component(s)).

Therefore, in accordance with a first aspect of the present invention there is provided a security server for providing security services to a client-server application program requiring secure access to a database comprising: a first secure communication channel interface for securely communicating with an application server running a server portion of the client-server application program; a second secure communication channel interface for securely communicating with the database; and a plurality of security components, each security component providing a unique security service to a client portion of the client-server application program.

In accordance with a second aspect of the present invention there is provided a method of acquiring security state information for a security component in a component-based security system, the method comprising the steps of: determining, responsive to a state of the security component being dependent on security state information of other security components, a dependency chain of security components upon which the state of the security component depends; acquiring the security state information from all the security components in the dependency chain; and informing the security component of the acquired state information.

BRIEF DESCRIPTION OF THE DRAWINGS

The invention will now be described in greater detail having reference to the attached drawings wherein:

FIG. 1 is a block diagram of the common hardware configuration of the present application;

FIG. 2 illustrates the security state acquisition process:

FIG. 3 illustrates the possible security-state acquisition transaction showing dependencies; and FIG. 4 is a dependency tree for common criteria (CC) functional component.

DETAILED DESCRIPTION OF THE INVENTION

The present invention addresses the seamless addition of a new security component into a security environment, while existing components are active, without this affecting performance, system stability or functioning or compromising the security of the system as a whole. This 'hot-loading' of components allows a security consumer to select and deploy only those security features they require, on configuration, then add new features as they need them, without having to take the system off-line.

FIG. 1 shows, in an exemplary embodiment, a common 3-tiered architecture which has been augmented with a new 4th tier containing a dedicated Security Server 12. This is the secure environment within which security components interact and through which the Application Server 14 is able to derive security services.

The Security Server 12 as shown, is deployed between the Application Server 14 and the Database 16 in order to both control access to the database from the Application Server and also to store and retrieve security state information using it. In FIG. 1 a security component 18 is a Generic Trusted Computing Base (G-TCB) component which provides a unique security service to the client application.

The present invention is composed of a system architecture and an associated process for dynamic acquisition of security states, which together provide a reliable, secure platform for the deployment of security services.

The architecture of the secure platform relies on the existence of a secure, transactional container that holds all security-related integration components and that has well-defined and secure external access channels. Security integration components, called G-TCBs (Generic Trusted Computing Bases) which correspond to a particular security service offered by the Security Server are also fundamental to the architecture. These G-TCBs have the property that their internal state, with respect to their security features, is clearly separated from other state variables and can be managed via a well-defined interface. This allows the non-ambiguous determination of security state at any instant in time.

The associated process for dynamic, live acquisition of a security state makes use of the benefits provided by the above architecture in order to create system integrity during system state transition. This capability enables a newly introduced G-TCB component to acquire the state of the system from its dependent G-TCBs (i.e. the security service offered by a G-TCB is dependent on the use of the service of another G-TCB) so it can synchronize its own internal state, without the need to disable the whole system. In this way an application is able to continue to make use of available security services without noticeable service degradation.

FIG. 2 is a UML collaboration diagram that captures the state transitions which lead to security system state synchronization within the present model. The process of dynamic state acquisition requires that an atomic transaction is defined consisting of the sequence of state acquisitions required from all dependencies in the dependency chain for this G-TCB (for example, an Authentication service G-TCB might need to depend upon the services of a User Data Protection service in order to carry out its security function; this is a G-TCB dependency chain).

FIG. 3 shows an exemplary transaction flow diagram for updating a New G-TCB and a possible dependency structure. In this example, G-TCB-A is dependent on G-TCB-C for its security state. The getSecState request queries the target G-TCB for its security state information relevant to the acquiring G-TCB.

There is no guarantee that cycles will not exist in the transaction (i.e. parallel requests for security state acquisition from the same G-TCB); in this case, a consistency check needs to take place in order to guarantee that step 2.1 of FIG. 3 returns the same result as step 2.2. If this is not the case then it is concluded that the system was not in a consistent state before the transaction was initiated. In this event, there is a roll-back (i.e. transaction aborted) and the system will try again at a later time to acquire security state, once the security state of the system is consistent throughout all its components (strictly speaking, it only needs to be consistent amongst the dependency chain components).

Transaction Management is a service which is provided by this component deployment environment. It is the responsibilty of this Management system to schedule and execute transactions so that no conflicts arise. It is also the responsibility of this system to perform roll-backs if any transactions do not execute to completion or produce an inconsistent final security state for the newly introduced G-TCB.

The nature of a dependency relies on how security functions are specified and how they relate to the software components. One such ontology is defined by the Common Criteria (CC), ISO15408 standard, an international standard for security assurance. Part 2 of this standard defines dependencies between functional security components which relate directly to the above dependency structure. FIG. 4 shows an example of the dependency chain for the FDP (Data Protection) functional component. It depends on the FMT (Static Attribute Initialization) component (Note: intra-Family dependencies, in this model, map to distinct functions within a G-TCB, and inter-Family dependencies define dependencies between different G-TCBs. In other words, there is a unique G-TCB for each Family in the CC).

The advantage of the methodology of the present invention lies in the architectural prerequisites: a dedicated Security server (so that security applications are separate and distinct from the business applications); and G-TCB software components which realize specific, unique security services which could be related directly to a set of criteria for evaluation of IT security, the Common Criteria being such a standard. Additionally these components have the property of being able to specify their own internal security state explicitly at any instant in time through a well-defined interface; transaction management (e.g. rollback); and, dependencies between security services in order to guarantee security state consistency across the whole security system, before, during and following dynamic system reconfiguration. In this way the security of the Security Server is not compromised nor is the security services it is providing to the business application interrupted.

All of these features combine to allow the security system to adopt a new component without the need for security service shut-down. A further benefit from a security perspective, of the decoupling between security and application processing is that an attack based on ambiguous call-of-service or a software bug in the application will not affect the functioning of the security engine.

Although there is significant prior art dealing with Dynamic Component-based System Reconfiguration, there does not appear to be any which specifically accounts for the security issues involved in this process. The dynamic loading of pure security components together with the strong separation of security and application logic has not been found in the prior art.

In order to guarantee that the security system is in a steady-state at the moment that a new G-TCB is added to it, the state acquisition transaction is executed atomically. In the event that an inconsistency is discovered between security state information received from any pair of dependencies for the new G-TCB, roll-back takes place. If the dependency chain is long then it could conceivably take a few attempts at introducing the G-TCB before state is acquired. In practice, if it is known that these chains are generally short, for example in the case of an implementation based on the Common Criteria Functional Component specification, and that the system is not highly dynamic (that is, the cumulative security state of the system is not in constant flux), then it is not likely that roll-back will occur.

Keeping the security state synchronized is paramount to protecting these networks. But keeping the number of services available to the user to the minimum required is also necessary especially for mobile devices which have limited storage capacity. This creates the possibility of a situation in which a certain security component is not loaded into the system but is requested by the user. In real-time and without shutting down the system this component will need to be loaded and to acquire security state in order to ensure the overall security of the system is not compromised. The technique described here achieves this and would prove valuable to mobile device vendors and service providers for these platforms.

Although particular embodiments of the invention have been described and illustrated it will be apparent to one skilled in the art that numerous changes can be made to the basic concept. It is to be understood, however, that such changes will fall within the full scope of the invention as defined by the appended claims.

We claim:

1. A security server for providing security services to a client-server application program requiring secure access to a database comprising:
   a first secure communication channel interface for securely communicating with an application server running a server portion of the client-server application program;
   a second secure communication channel interface for securely communicating with the database; and
   a plurality of security components, each security component providing a unique security service to a client portion of the client-server application program, wherein each security component has a security state comprising one or more internal security state variables, each internal security state variable having a state that is independent of any non-security state variables.

2. The security server as defined in claim 1 wherein at least one of the security components has a dependent internal state variable that is dependent on the security state of another security component thereby forming a dependency chain of security components for each of the at least one security component.

3. The security server as defined in claim 2 further having transaction means for acquiring security state information for said at least one of the security components according to dependency chain of the security components.

4. The security server as defined in claim 3 wherein the transaction means is operable to abort acquisition of security state information for a security component responsive to being unable to obtain, in a single transaction, all security state information associated with the dependency chain of that security component.

5. The security server as defined in claim 3 wherein the transaction means is operable to abort acquisition of security state information in the event the security state information from different security components in the dependency chain is different.

6. The security server as defined in claim 4 wherein the transaction means is operable to re-initiate acquisition of security state information a set time interval after acquisition has been aborted.

7. The security server as defined in claim 5 wherein the transaction means is operable to re-initiate acquisition of security state information a set time interval after acquisition has been aborted.

8. A method of acquiring security state information for a security component in a component-based security system, the method comprising the steps of
   a) determining, responsive to a state of the security component being dependent on security state information of other security components, a dependency chain of security components upon which the state of the security component depends;
   b) acquiring the security state information from all the security components in the dependency chain; and
   c) informing the security component of the acquired state information.

9. The method as defined in claim 8 wherein the step of acquiring the security state information is aborted if all security state information in the dependency chain can not be obtained in a single transaction.

10. The method as defined in claim 8 wherein the step of acquiring the security state information is aborted if all security state information received from respective security components in the dependency chain is not the same.

11. The method as defined in claim 9 wherein the step of acquiring the security state information is re-initiated a set time interval after the step has been aborted.

12. The method as defined in claim 10 wherein the step of acquiring the security state information is re-initiated a set time interval after the step has been aborted.

* * * * *